United States Patent [19]

Becker et al.

[11] Patent Number: 5,708,117
[45] Date of Patent: Jan. 13, 1998

[54] COATING AGENTS AND USE THEREOF AS PRIMERS AND/OR FILLERS IN THE PRODUCTION OF MULTILAYER LACQUER COATINGS

[75] Inventors: Heinz Dietholf Becker, Bonn; Gerhard Bremer, Frechen; Fritz Sadowski, Pulheim; Werner Stephan, Wuppertal, all of Germany

[73] Assignee: Herberts Gesellschaft mit Beschrankter Haftung, Wuppertal, Germany

[21] Appl. No.: 613,918

[22] Filed: Mar. 11, 1996

Related U.S. Application Data

[63] Continuation of Ser. No. 241,286, May 11, 1994, abandoned.

[30] Foreign Application Priority Data

May 20, 1993 [DE] Germany ..................... 43 16 912.0

[51] Int. Cl.$^6$ ..................... C08G 18/10; C08G 18/30
[52] U.S. Cl. ..................... 528/60; 528/52; 528/65; 528/75; 528/84; 528/85; 524/31; 524/32; 428/31; 428/423.1; 428/423.7; 428/570; 428/629; 428/632; 427/402; 427/407.1; 427/412.2; 427/415; 427/419.2
[58] Field of Search ..................... 528/60, 65, 75, 528/84, 85, 52; 428/423.3, 31, 423.1, 423.7, 570, 629, 632; 524/31, 32; 427/402, 407.1, 412.2, 415, 419.2

[56] References Cited

U.S. PATENT DOCUMENTS 4,710,556  12/1987  Plum .......................... 526/273
4,855,342   8/1989  Becker et al. ................ 524/31

Primary Examiner—Duc Truong
Attorney, Agent, or Firm—Fitch, Even, Tabin & Flannery

[57] ABSTRACT

The description relates to coating agents for use as primers and fillers in the manufacture of multilayer lacquer coatings, more particularly in the motor-vehicle sector.

The coating agent contains a binder mixture of

A) 60–75 wt. % of a hydroxy-functional copolymer with an OH number of 110 to 170 mg KOH/g, obtainable from
  a) 5–60 wt. %, preferably 10–30 wt. % of at least one diester of an alpha, beta-olefinically unsaturated dicarboxylic acid with saturated monohydric alcohols containing 1–8 carbon atoms,
  b) 10–70 wt. %, preferably 35–60 wt. % of one or more vinyl aromatic hydrocarbons,
  c) 0–30 wt. %, preferably 0–15 wt. % of one or more glycidyl esters of aliphatic saturated monocarboxylic acids branched in the alpha position,
  d) 25–50 wt. % of at least one hydroxy alkyl ester or a mixture of at least one alkyl ester and one hydroxyl alkyl ester of an alpha, beta-olefinically unsaturated monocarboxylic acid, and
  e) 0–10 wt. % of one or more alpha, beta-unsaturated monocarboxylic acids, B) 1–6 wt. % of ester-soluble nitrocellulose, C) 0.5–1.8 wt. % calcium oxide and D) 25–35 wt. % of one or more divalent or polyvalent polyisocyanates.

20 Claims, No Drawings

COATING AGENTS AND USE THEREOF AS PRIMERS AND/OR FILLERS IN THE PRODUCTION OF MULTILAYER LACQUER COATINGS

This application is a continuation of Ser. No. 08/241,286 filed May 11, 1994 now abandoned.

The invention relates to a coating agent containing a binder mixture of an ester-soluble nitrocellulose, a hydroxy-functional copolymer and a lacquer polyisocyanate, pigments and/or fillers, solvents and optional conventional lacquer additives. The coating agent according to the invention is particularly suitable for preparing primers or as a filler in multilayer lacquer coatings, particularly in the motor-vehicle sector.

Coating agents based on polyhydroxyl acrylate resins, lacquer polyisocyanates and nitrocellulose are already known. It is also known to use them as primers or fillers, particularly in the motor-vehicle sector. EP-A-269 035 describes a coating agent of this kind, containing a binder mixture of 60–75 wt. % of a hydroxy-functional copolymer, obtained by reaction of styrene and/or a styrene derivative with a hydroxyalkyl ester of (meth)acrylic acid and a (meth)acrylate, the homopolymer of which has a glass transition temperature above 40° C., 1–5 wt. % of ester-soluble nitrocellulose and 25–35 wt. % polyisocyanate. The resulting coating agents are suitable for forming layers up to 400 μm thick, but have the disadvantage that they cannot be worked at very low temperatures. In addition, the pot life and solvent content of these coating agents are as yet unsatisfactory.

DE-A-35 46 594 describes copolymers obtainable by reacting 21–70 wt. % styrene and/or vinyl toluene, 10–39 wt. % hydroxyalkyl ester of (meth)acrylic acid, 0–2 wt. % (meth)-acrylic acid and/or iraconic acid, 0–20 wt. % alkyl esters of (meth)acrylic acid and 0–38 wt. % butyl acrylate and/or 2-ethyl hexyl acrylate. These copolymers can be used together with epoxy resins and nitrocellulose as primers or as priming or spray fillers. The disadvantages of these coating agents are the low content of solids and the relatively high content of solvent.

The object of the invention is to provide coating agents which are particularly suitable for producing primers and fillers and can be processed without difficulty even at low temperatures, and have a sufficient pot life and a relatively low solvent content.

This object is achieved by the coating agent containing a binder mixture comprising an ester-soluble nitrocellulose, a lacquer polyisocyanate and a hydroxy-functional copolymer, pigments and/or fillers, solvents and optional conventional lacquer adjuvants, characterised in that the binder substantially comprises A) 60–75 wt. % of a hydroxy-functional copolymer with an OH number of 110 to 170 mg KOH/g, obtainable from
  a) 5–60 wt. %, preferably 10–30 wt. % of at least one diester of an alpha, beta-olefinically unsaturated dicarboxylic acid with saturated monohydric alcohols containing 1–8 carbon atoms,
  b) 10–70 wt %, preferably 35–60 wt. % of one or more vinyl aromatic hydrocarbons,
  c) 0–30 wt. %, preferably 0–15 wt. % of one or more glycidyl esters of aliphatic saturated monocarboxylic acids branched in the alpha position,
  d) 25–50 wt. % of at least one hydroxy alkyl ester or a mixture of at least one alkyl ester and one hydroxy alkyl ester of an alpha, beta-olefinically unsaturated monocarboxylic acid, and
  e) 0–10 wt. % of one or more alpha, beta-unsaturated monocarboxylic acids,
B) 1–6 wt. % of ester-soluble nitrocellulose,
C) 0.5–1.8 wt. % calcium oxide and
D) 25–35 wt. % of one or more divalent or polyvalent polyisocyanates.

The sum of components A), B), C) and D), and a), b), c), d) and e) is 100 wt. % in each case.

It has been found that the coating agents according to the invention can be used to prepare primers and fillers which, in the state ready for spraying, have a high solids content and dry very quickly even at low temperatures. Surprisingly, no tendency to blister has been observed even at higher layer thicknesses up to 250 μm, although a binder with a relatively high hydroxyl number is used.

The copolymer (component A) used in the coating agents according to the invention can be prepared by polymerisation by conventional methods, e.g. substance, solution or bead polymerisation. The various methods of polymerisation are well-known and described in Houben-Weyl, Methoden der Organischen Chemie, 4th edition, Volume 14/1, pages 24–255 (1961).

Preferably the hydroxyl group-containing copolymer is prepared by radical substance polymerisation. Such copolymers and manufacture thereof are described in DE-A-31 01 887. Conventional radical-forming compounds are used as polymerisation initiators.

The initiators can e.g. be aliphatic azo compounds such as azo isobutyric acid nitrile or peroxides such as diacyl peroxides, e. g. dibenzoyl peroxide, or dialkyl peroxides such as di-tert.-butyl peroxide, or dialkyl hydroperoxides such as tert.-butyl hydroperoxide. Di-tert. butyl peroxide is specially preferred.

The proportion thereof is generally 0.5 to 2.5, preferably 0.5 to 1.9 wt. % relative to the total weight of the starting components.

The initiator can be added gradually with the monomers. A part of the initiator can be added right at the beginning with component A and another part can be introduced into the reactor gradually with the other monomers. After all the monomers have been introduced, no additional amount of initiator is usually necessary for completing the polymerisation. In some cases, however, an additional quantity of 0.1 to 1.0 wt. % initiator can be added at intervals after all the monomers have been supplied, but in such cases the proportion of initiator should not exceed 2.5 wt. %.

The polymerisation temperature depends on the desired molecular weight and is usually considerably above the melting-point of the resulting copolymer, preferably between 150° and 190° C., more particularly between 160° and 185° C. At the polymerisation temperature, therefore, the copolymer is liquid and can easily be agitated. After polymerisation it can optionally be diluted or cooled without a solvent, in which case it hardens to a solid and can be ground.

The components a) can be maleic or fumaric acid esters, preferably with saturated monohydric alcohols containing 1 to 8, preferably 1 to 4 carbon atoms in the molecule, such as dimethyl maleinate, diethyl fumarate, di-butyl maleinate or dibutyl fumarate.

The component b) can e.g. be styrene, alkyl styrene, e.g. alphamethyl styrene or a vinyl toluene, individually or in a mixture.

Component c) preferably comprises glycidyl esters of alpha-monoalkyl and/or alpha, alpha-dialkyl alkane monocarboxylic acids with 12 to 14 carbon atoms.

Hydroxyalkyl esters suitable as component d) can e.g. be the hydroxyalkyl esters of acrylic, methacrylic or crotonic acid, preferably with 1–12 carbon atoms in the hydroxyalkyl radical. The following are examples of preferred hydroxy alkyl esters: hydroxymethyl methacrylate, hydroxyethyl methacrylate, hydroxymethyl acrylate, hydroxyethyl acrylate, butanediol-1,3-monoacrylate, butanediol-1,4-monomethacrylate, butanediol-1,2-monoacrylate or butanediol-1,2-monomethacrylate.

Alkyl esters suitable as component d) can e.g. be the alkyl esters of acrylic, methacrylic or crotonic acid with monohydric alcohols, preferably with 1 to 12 carbon atoms, such as methanol, ethanol or the various butanols. Methyl methacrylate, ethyl methacrylate, tert-butyl acrylate and tert-butyl methacrylate are very suitable.

The proportions of hydroxy alkyl esters and alkyl esters in component d) are adjusted to obtain the desired OH number.

The component e) is preferably acrylic acid, methacrylic acid or crotonic acid.

The nitrocellulose (celluose nitrate) used as component B) in the coating agent according to the invention should be soluble in organic ester solvents. Nitrocellulose with a nitrogen content of 10 to 15%, e,. g. 11.8 to 12.25%, is suitable for this purpose. Nitrocellulose of this kind is soluble in esters and practically insoluble in alcohols.

However, it can be extensively blended with alcohols and aromatics. Ester solvents for dissolving the nitrocellulose of use according to the invention can e.g. be esters subsequently present in the finished coating agents.

Advantageously and preferably, the natural viscosity of the nitrocellulose as expressed by the K value after H. Fikentscher (Cellulosechemie 13, page 58 (1932)) is in the range from 300 to 600 (measurement: 2 grams nitrocellulose in 100 ml acetone at 25° C.).

Nitrocellulose with a K value of 400, e.g. Collodium wool® E 400 B (Wolff Walsrode AG) is particularly preferred.

The component C) in the coating agent according to the invention is calcium oxide in a proportion of 0.5 to 1.8 wt. % relative to the total solids content of the coating agent. The calcium oxide (CaO) is pulverulent. For example, commercial fine-grained powder is suitable.

Polyisocyanates (component D) are used for cross-linking the binder mixture of copolymer and ester-soluble nitrocellulose according to the invention. The polyisocyanates are conventional lacquer polyisocyanates. The proportion of polyisocyanate cross-linking agents is chosen so as to obtain 0.5 to 2 isocyanate groups per hydroxyl group in the binder mixture. Excess isocyanate groups can react with moisture and contribute to the cross-linking.

The following are some examples of suitable polyisocyanates: aliphatic, cycloaliphatic and aromatic polyisocyanates such as hexamethylene diisocyanate, trimethyl hexamethylene diisocyanate, isophorone diisocyanate, 4,4'-diisocyanatodicyclohexyl methane, toluylene-2,4-diisocyanate, o-, m- and p-xylylene diisocyanate, 4,4'-diisocyanatodiphenyl methane; polyisocyanates masked with CH—, NH— or OH— acid compounds, or polyisocyanates containing biuret, allophanate, urethane or isocyanurate groups.

These polyisocyanates can e.g. be a reaction product of 3 mols hexamethylene diisocyanate and 1 mol water and containing biuret groups, or a polyisocyanate containing isocyanurate groups prepared by trimerisation of 3 mols hexamethylene diisocyanate, or polyisocyanates containing urethane groups and obtained by a reaction between 3 mols of toluylene diisocyanate and 1 mol trimethylol propane.

In order to manufacture the coating agents according to the invention, the individual components are mixed together and homogenised or ground in known manner. For example the procedure can be as follows: firstly the hydroxy-functional copolymer (component A) is mixed with the calcium oxide (C), pigments and/or fillers and conventional lacquer adjuvants and solvents if present, a dispersion is formed and then the nitrocellulose (component B) is added in the form of a solution, followed by a grinding operation. The polyisocyanate (component D) can then be added. Alternatively the polyisocyanate (component D) can be stored separately in solution form and added to the other pre-mixed components directly before use of the coating agent.

The solvents for the coating agents according to the invention can e.g. be:

Glycol ethers such as ethylene glycol dimethyl ether,

Glycol ether esters such as ethyl glycol acetate, butyl glycol acetate, 3-methoxy-n-butyl acetate, butyl diglycol acetate, or methoxy propyl acetate, Esters such as butyl acetate, isobutyl acetate or amyl acetate, or Ketones such as methyl ethyl ketone, methyl isobutyl ketone, diisobutyl ketone, cyclohexanone or isophorone.

Use can also be made of aromatic hydrocarbons such as xylene, Solvesso 100 (registered trade mark) or aliphatic hydrocarbons, optionally blended with the aforementioned solvents.

The proportion of solvent used depends on the desired viscosity of the final coating agent.

Conventional pigments can be added to the coating agents according to the invention. Conventional inorganic and/or organic pigments can be used. These pigments can serve as colour pigments or as anti-corrosion pigments. Iron oxide pigments and titanium dioxide are examples of usable colour pigments. The anti-corrosion pigment can e.g. be zinc phosphate.

The coating agents according to the invention can also contain fillers, i. e. conventional fillers such as are used for coating agents and influence e.g. the adhesiveness, the elasticity, drying, grindability and the film hardness of coatings made from the coating agents.

The fillers can e.g. be silicic acid or silicon oxide e.g. for improving the adhesion, film hardness, liberation of solvent and for influencing the grindability), aluminium silicate (e.g. for improving the grindability), magnesium silicate (e.g. for increasing the adhesiveness) or barium sulphate (e.g. for improving the film hardness).

The ratio of fillers and/or pigments to binders (components A, B, C and D) (solid on solid proportions by weight) is preferably 70–80 to 30–20. The coating agents according to the invention can also be mixed with conventional additives used in lacquer technology, e.g. thixotropic agents such as montmorillonite or pyrogenic silicon dioxide. Organic metal salts such as dibutyl tin dilaurate or zinc naphthenate are other examples. These catalysts are of assistance in thorough drying, with the result that the coatings become grindable more quickly. Wetting agents such as ionic or non-ionic wetting agents, corrosion-preventing agents, etc. are other examples of conventional lacquer additives.

The coating agents according to the invention are suitable for forming coatings on a wide variety of substrates, such as metal, wood, ceramics or plastics. They are of particular use in the motor-vehicle industry and in other industrial sectors involving mass-produced coatings, or in the repair sector. They are particularly suitable for repairing damage to lacquer on motor vehicles, particularly passenger cars.

They can be applied to the substrate as such or to conventional primers. They are particularly suitable as fillers. In practice they are used more particularly in the form of two-component materials, i.e. component D is added directly before use to components A), B), C) and optional additives. A diluent can be added if desired but is not necessary.

The coating agents according to the invention can be applied by various methods, e.g. by spraying (e.g. compressed-air sprays) or by brush or spatula.

Coatings made from the coating agents according to the invention dry quickly even at low temperatures down to 8° C. and can be ground particularly well when wet or dry. They form very good films without blistering even at greater layer thicknesses. The pot life is up to 90 minutes.

The invention therefore provides a coating agent having a high content of solids and a relatively low content of solvents when in the state ready for spraying. It is therefore particularly eco-friendly and extremely good as a filler. Owing to the low tendency to form blisters, it dries easily and hardens even in relatively thick layers. It adheres to a wide variety of substrates such as bare sheet steel, ground substrates, polyvinyl butyral primers, 2K-epoxide primers, partly ground works lacquers or waste lacquers (except for thermoplastic lacquers) and is therefore particularly useful in the motor vehicle repair sector. For example, spots of polyethylene applied with a spatula can be covered by the coating agent according to the invention, dried and ground and then covered with conventional surface lacquers, e.g. based on 2K acrylate and isocyanate. The covering lacquer usually adheres very firmly and is therefore particularly suitable as a patching compound or filler.

The invention will be explained in detail with reference to the following examples.

Manufacture of component A)

A hydroxyl group-containing copolymer was prepared according to DE 31 01 887, example I/4.

Preparation of a filler:

The following is an example of a coating agent according to the invention, of use as a 2K filler Formulation of starting component (wt. %):

18% hydroxyl group-containing copolymer as per DE 31 01 887, example I/4, 70% in butyl acetate (component A)

10% butyl acetate 98/100

5% methoxybutyl acetate

5% Solvesso 100

0.5% electroneutral wetting agent 0.3% montmorillonite

1% pyrogenic silicic acid 0.3% iron oxide black 1.3% iron oxide yellow 0.1% iron oxide red 1.2% silicon dioxide 5.5% magnesium silicate 6.5% zinc phosphate 14% titanium dioxide 13% aluminium silicate 13% barium sulphate 0.3% zinc naphthenate 0.8% dibutyl tin dilaurate (DBTL)

0.2% calcium oxide (component C)

4% commercial nitrocellulose (component B)

Formulation of activator (wt. %)

48% polyisocyanate based on hexamethylene diisocyanate (Desmodur N 75, in butyl acetate 98/100) (component D)

30% butyl acetate 98/100

7% xylene

9% methoxypropyl acetate

6% DBTL 1% in butyl acetate 98/100

The starting component was prepared as follows:

Component A), the solvent and the wetting agent were placed and agitated in a dry container cleaned with butyl acetate. Montmorillonite was added with agitation and dispersed at 35°–40° C., using a conventional dispersing device. The other components, except for component B), were then sprinkled with agitation and dispersed at 40°–50° C. After the nitro-cellulose solution had been added, the mixture was left to swell for 12 hours, and was then ground to a particle fineness of 25–30 μm.

The activator was prepared, depending on the formulation. The starting component and the activator were mixed in the ratio 4:1 by volume.

The resulting coating agent was applied in layers 100 μm and 250 μm thick by spraying an iron sheet. Blister-free coatings dried in air were obtained in both cases.

We claim:

1. A coating composition comprising:
   (A) 60 to 75 weight percent of a hydroxyl-functional copolymer with an OH number of 110 to 170 mg KOH/g prepared by polymerizing
      (a) 5 to 60 weight percent of a diester of an alpha, beta-olefinically unsaturated dicarboxylic acid with a saturated alcohol having 1 to 8 carbon atoms;
      (b) 10 to 70 weight percent of a vinyl aromatic hydrocarbon;
      (c) 0 to 30 weight percent of a glycidyl ester of an aliphatic saturated monocarboxylic acid branched at the alpha position;
      (d) 25 to 50 weight percent of a hydroxyl alkyl ester of an alpha, beta-olefinically unsaturated monocarboxylic acid or a mixture of an alkyl ester and an hydroxyl alkyl ester of alpha, beta-olefinically unsaturated monocarboxylic acids; and
      (e) 0 to 10 weight percent of an alpha, beta-unsaturated monocarboxylic acid,
   (B) 1 to 6 weight percent of an ester-soluble nitrocellulose,
   (C) 0.5 to 1.8 weight percent calcium oxide, and
   (D) 25 to 35 weight percent of a polyisocyanate crosslinker;
   wherein the coating composition can be applied to a substrate and is curable at relatively low temperatures.

2. A coating composition as defined in claim 1, wherein the hydroxyl-functional copolymer is prepared by polymerizing
   (a) 10 to 30 weight percent of a diester of an alpha, beta-olefinically unsaturated dicarboxylic acid with a saturated alcohol having 1 to 8 carbon atoms;
   (b) 35 to 60 weight percent of a vinyl aromatic hydrocarbon;
   (c) 0 to 15 weight percent of a glycidyl ester of an aliphatic saturated monocarboxylic acid branched at the alpha position;
   (d) 25 to 50 weight percent of a hydroxyl alkyl ester of an alpha, beta-olefinically unsaturated monocarboxylic acid or a mixture of an alkyl ester and an hydroxyl alkyl ester of alpha, beta-olefinically unsaturated monocarboxylic acids; and (e) 0 to 10 weight percent of an alpha, beta-unsaturated monocarboxylic acid.

3. A coating composition as defined in claim 1, further containing at least one agent selected from the group consisting of pigments, fillers, organic solvents, and lacquer adjuvants.

4. A coating composition as defined in claim 2, further containing at least one agent selected from the group consisting of pigments, fillers, organic solvents, and lacquer adjuvants.

5. A method of preparing a multilayer lacquer coating on a substrate, said method comprising (1) applying a plurality of layers of a coating composition to the substrate and (2) curing the applied layers at a relatively low temperature, wherein the coating composition comprises:

(A) 60 to 75 weight percent of a hydroxyl-functional copolymer with an OH number of 110 to 170 mg KOH/g prepared by polymerizing
  (a) 5 to 60 weight percent of a diester of an alpha, beta-olefinically unsaturated dicarboxylic acid with a saturated alcohol having 1 to 8 carbon atoms;
  (b) 10 to 70 weight percent of a vinyl aromatic hydrocarbon;
  (c) 0 to 30 weight percent of a glycidyl ester of an aliphatic saturated monocarboxylic acid branched at the alpha position;
  (d) 25 to 50 weight percent of a hydroxyl alkyl ester of an alpha, beta-olefinically unsaturated monocarboxylic acid or a mixture of an alkyl ester and an hydroxyl alkyl ester of alpha, beta-olefinically unsaturated monocarboxylic acids; and
  (e) 0 to 10 weight percent of an alpha, beta-unsaturated monocarboxylic acid, (B) 1 to 6 weight percent of an ester-soluble nitrocellulose, (C) 0.5 to 1.8 weight percent calcium oxide, and (D) 25 to 35 weight percent of a polyisocyanate crosslinker.

6. A method as defined in claim 5, wherein the hydroxyl-functional copolymer is prepared by polymerizing (a) 10 to 30 weight percent of a diester of an alpha, beta-olefinically unsaturated dicarboxylic acid with a saturated alcohol having 1 to 8 carbon atoms;

(b) 35 to 60 weight percent of a vinyl aromatic hydrocarbon;

(c) 0 to 15 weight percent of a glycidyl ester of an aliphatic saturated monocarboxylic acid branched at the alpha position;

(d) 25 to 50 weight percent of a hydroxyl alkyl ester of an alpha, beta-olefinically unsaturated monocarboxylic acid or a mixture of an alkyl ester and an hydroxyl alkyl ester of alpha, beta-olefinically unsaturated monocarboxylic acids; and (e) 0 to 10 weight percent of an alpha, beta-unsaturated monocarboxylic acid.

7. A method as defined in claim 5, wherein the coating composition further contains at least one agent selected from the group consisting of pigments, fillers, organic solvents, and lacquer adjuvants.

8. A method as defined in claim 6, wherein the coating composition further contains at least one agent selected from the group consisting of pigments, fillers, organic solvents, and lacquer adjuvants.

9. A method as defined in claim 5, wherein the substrate is a motor vehicle.

10. A method as defined in claim 6, wherein the substrate is a motor vehicle.

11. A method as defined in claim 5, wherein a primer is first applied to the substrate and the coating composition is then applied to the primer-treated substrate.

12. A method as defined in claim 6, wherein a primer is first applied to the substrate and the coating composition is then applied to the primer-treated substrate.

13. A method as defined in claim 5, wherein the coating composition also acts as a filler in layers up to a total thickness of about 250 μm.

14. A method as defined in claim 6, wherein the coating composition also acts as a filler in layers up to a total thickness of about 250 μum.

15. A method of preparing a multilayer lacquer coating on a substrate, said method comprising (1) applying at least one primer or filler layer of a coating composition to the substrate, (2) curing the applied primer or filler layer at a relatively low temperature, (3) applying at least one lacquer layer to the cured primer or filler layer, and (4) curing the applied lacquer layer, wherein the coating composition comprises:

(A) 60 to 75 weight percent of a hydroxyl-functional copolymer with an OH number of 110 to 170 mg KOH/g prepared by polymerizing
  (a) 5 to 60 weight percent of a diester of an alpha, beta-olefinically unsaturated dicarboxylic acid with a saturated alcohol having 1 to 8 carbon atoms;
  (b) 10 to 70 weight percent of a vinyl aromatic hydrocarbon;
  (c) 0 to 30 weight percent of a glycidyl ester of an aliphatic saturated monocarboxylic acid branched at the alpha position;
  (d) 25 to 50 weight percent of a hydroxyl alkyl ester of an alpha, beta-olefinically unsaturated monocarboxylic acid or a mixture of an alkyl ester and an hydroxyl alkyl ester of alpha, beta-olefinically unsaturated monocarboxylic acids; and
  (e) 0 to 10 weight percent of an alpha, beta-unsaturated monocarboxylic acid, (B) 1 to 6 weight percent of an ester-soluble nitrocellulose, (C) 0.5 to 1.8 weight percent calcium oxide, and (D) 25 to 35 weight percent of a polyisocyanate crosslinker.

16. A method as defined in claim 20, wherein the hydroxyl-functional copolymer is prepared by polymerizing (a) 10 to 30 weight percent of a diester of an alpha, beta-olefinically unsaturated dicarboxylic acid with a saturated alcohol having 1 to 8 carbon atoms;

(b) 35 to 60 weight percent of a vinyl aromatic hydrocarbon;

(c) 0 to 15 weight percent of a glycidyl ester of an aliphatic saturated monocarboxylic acid branched at the alpha position;

(d) 25 to 50 weight percent of a hydroxyl alkyl ester of an alpha, beta-olefinically unsaturated monocarboxylic acid or a mixture of an alkyl ester and an hydroxyl alkyl ester of alpha, beta-olefinically unsaturated monocarboxylic acids; and (e) 0 to 10 weight percent of an alpha, beta-unsaturated monocarboxylic acid.

17. A method as defined in claim 16, wherein the coating composition further contains at least one agent selected from the group consisting of pigments, fillers, organic solvents, and lacquer adjuvants.

18. A method as defined in claim 16, wherein the coating composition further contains at least one agent selected from the group consisting of pigments, fillers, organic solvents, and lacquer adjuvants.

19. A method as defined in claim 15, wherein the substrate is a motor vehicle.

20. A method as defined in claim 16, wherein the substrate is a motor vehicle.

* * * * *

UNITED STATES PATENT AND TRADEMARK OFFICE
CERTIFICATE OF CORRECTION

PATENT NO. : 5,708,117
DATED : January 13, 1998
INVENTOR(S) : Becker et al.

It is certified that error appears in the above-indentified patent and that said Letters Patent is hereby corrected as shown below:

Claim 14, Column 8, line 16, change "$\mu$um" to --$\mu$m--

Claim 16, Column 8, line 48, change "20" to --15--.

Signed and Sealed this

Twelfth Day of May, 1998

Attest:

Attesting Officer

BRUCE LEHMAN

Commissioner of Patents and Trademarks